United States Patent [19]

Gandhi

[11] Patent Number: 5,851,578
[45] Date of Patent: Dec. 22, 1998

[54] CLEAR OR TRANSLUCENT LIQUID BEVERAGE WITH SOULUBLE FIBER AND NUTRIENTS

[75] Inventor: Amita Gandhi, Louisville, Ky.

[73] Assignee: Soma Technologies, Marlton, N.J.

[21] Appl. No.: 786,219

[22] Filed: Feb. 21, 1997

[51] Int. Cl.$^6$ ................................. A23L 2/54; A23L 2/68
[52] U.S. Cl. ............................ 426/590; 426/73; 426/74; 426/99; 426/573; 426/599
[58] Field of Search ............................ 426/599, 74, 590, 426/73, 99, 573

[56] References Cited

U.S. PATENT DOCUMENTS

| | | | |
|---|---|---|---|
| 4,834,990 | 5/1989 | Amer | 426/599 |
| 5,009,819 | 4/1991 | Popescu et al. | 424/450 |
| 5,558,897 | 9/1996 | Goldman | 420/74 |

*Primary Examiner*—Helen Pratt

[57] ABSTRACT

A formulation of physiologically-effective clear/translucent beverage containing non-gel forming soluble fibre and a soluble salt of calcium and other mineral supplements along with pharmaceutically-active components with organoleptic properties similar to a regular beverage is disclosed. This formulation refers to a powder mix, a liquid concentrate or a ready-to-drink bottled beverage. The powder mix and the liquid concentrate can be diluted with water or other ingestible liquids to reconstitute into the above beverage. The beverage contains food acids as buffering agents to prevent precipitation and enhance solubilization of the metal salts in neutral or weakly alkaline conditions. The drink could contain other nutrients, vitamins, pharmaceutically active ingredients, liposomes and herbal products. The mineral salts can be incorporated into the beverage either by in situ preparation by reaction of the basic metal salts with food acids or by solubilizing the appropriate preformed organic salts. The beverage can be formulated as a carbonated cola drink providing adequate amount of fiber, calcium and other nutrients, especially for population known to have dietary deficiency in these ingredients or for those having problems related to their absorption.

18 Claims, No Drawings

CLEAR OR TRANSLUCENT LIQUID BEVERAGE WITH SOULUBLE FIBER AND NUTRIENTS

BACKGROUND OF THE INVENTION

1. Field of the Invention

This invention relates to a clear/translucent carbonated or non-carbonated beverage containing soluble fiber along with minerals, nutrients and/or treating agents. The formulation could be in a ready-to-drink form in a container, or in the form of a concentrate or powder mix to be reconstituted with water or orally ingestable liquids into a clear to translucent beverage.

2. Description of Related Art

The present invention relates to a clear beverage formulation containing soluble fiber, minerals and nutrients in a ready to drink form or as a powder mix or liquid concentrate for reconstitution with water or orally ingestable liquids. A combination of clear soluble dietary fiber with readily soluble buffered calcium and minerals in a drink form is a healthful beverage of choice for menopausal women and for people with calcium deficiencies and need for dietary fiber requirement. Such products with dual intent are not described in the scientific or patent literature. Several US and foreign patents describe methods to render vegetable gums and mucilages/synthetic polymers insoluble in aqueous solution and make them readily re-dispersible at the time of reconstitution from the powder blend. These products suffer from poor patient acceptance due to the gritty nature of these fibrous dispersions and high viscosity of the final beverage upon storage for few minutes. These drinks have to be swallowed immediately after reconstitution otherwise they form viscous gel solutions which are difficult to drink/swallow. Commercially marketed product, Metamucil® from Procter and Gamble also suffers from similar shortcomings. Incorporation of calcium or other minerals and nutraceuticals worsens the problem of patient compliance due to the added amount of suspended solids and taste problems associated with these ingredients. European patent EPO 0080673 describes many problems associated with the use of guar gum from different dosage forms. U.S. Pat. No. 2,935,408 describes the use of glyceryl monostearate-impregnated-gums as a way of stabilizing the guar gum slurries in aqueous formulations. U.S. Pat. No. 4,754,027 describes coating of guar gum with fatty acids and film forming polymers as a way to reduce gelation in aqueous formulations. Such products tend to inherit all the shortcomings that have been previously described or associated with vegetable gums and in some cases, worsen the patient acceptance of these products compared to the untreated products. U.S. Pat. No. 5,118,510 issued to Hauser-Kuhrts, Inc. describes fiber drink mix as a Niacin drink mix formulation with a blend of gel-forming fiber along with gas-forming acids and inorganic mineral compounds. U.S. Pat. No. 5,009,916 issued to Colliopoulus John of The Procter and Gamble Company describes psyllium fiber drink mix. Calcium and vitamin C containing beverage product with improved color stability is described in U.S. Pat. No. 5,424,082. Stable nutritional vitamin and mineral supplemented beverage is described in U.S. Pat. No. 4,992,282. Method of making calcium fortified soy milk beverage is described in U.S. Pat. No. 4,906,482.

A majority of these patents do not address the issue of the quantities of these drinks required to get the daily recommended allowance of calcium and other nutrients from such preparations. Such nutritional products also lack organoleptic properties for good consumer acceptance. Psyllium containing products can not be formulated as clear low viscosity drink either as ready to use drink or as a dry blend for reconstitution. Psyllium or cellulose derivatives suffer from low clarity and high viscosity. Viscosity of the soluble fiber appears to be the major limiting factor with respect to patient acceptance of these products. Low viscosity water-like product appears to have high level of consumer satisfaction and patient compliance with respect to regularity of use and acceptance of the product as a substitute for any other beverage. Accepted calcium salts like calcium carbonate, calcium phosphate and calcium citrate for biological use tend to have very poor water solubility and can not be incorporated in clear liquids in sufficiently large amounts inorder to supply elemental calcium in 400 mg range.

There is thus a need for good tasting water-like beverage with soluble fiber and substantial amounts of calcium, vitamins and other minerals to meet the U.S. Daily Recommended Allowances.

SUMMARY OF THE INVENTION

Rationale of the present invention is to provide a clear/translucent ready-to-drink beverage or a concentrate in a solid (powder mix) or a liquid form for reconstitution into a beverage containing large amounts of soluble calcium, mineral and vitamin supplements along with soluble fiber. Soluble forms of calcium and fiber is one of the important aspects of this invention along with their combination to provide a beverage which is close in taste profile to the current marketed fruit and cola beverages.

Commercially marketed fiber-containing products like Metamucil are not well received by patients with respect to taste and appearance of the final product at the time of consumer intake. These types of products tend to form gritty, difficult to swallow gels on mixing with water. Such types of products can not be consumed as a regular beverage due to their poor organoleptic properties.

Calcium supplements tend to be large tablets which are difficult to swallow due to large quantity of calcium compounds required to meet daily requirements. We need approximately 2.5 gm of calcium carbonate, 4.2 gm of calcium citrate, 3.4 gm of dibasic calcium phosphate, 10.74 gm of calcium gluconate or 5.5 gm of calcium lactate to meet U.S. RDA for calcium supplements. Such large doses of calcium are difficult to administer as a single tablet and so, multiple tablets are required to get the Recommended Daily Allowance. Organic salts of calcium are well absorbed but their dose required to supply the required Calcium amount is too large for tablets and forces one to check into other forms of delivery systems.

Calcium carbonate, the major natural source of calcium, is insoluble in water and in intestinal fluids and requires stomach acid to convert into a soluble form. Solubility of calcium carbonate is 0.0014 to 0.0056% and that of calcium citrate is 0.096% compared to the temperature dependent solubility of around 9% with calcium lactate. Achlorhydria or lack of acid in stomach is a common disorder in geriatric population and in people taking $H_2$-receptor antagonists and proton pump inhibitors. Calcium absorption from insoluble calcium sources is thus significantly compromised by achlorhydria (N. Eng, J. Med. 1985; 313:70–3). Calcium lactate, due to its high solubility and good taste profile, appears to be an ideal candidate for incorporation into a good tasting calcium drink.

Geriatric population seems to suffer from both calcium and soluble fiber deficiency. There is a good rationale for their combination to get important health benefits. Constipation and irregular bowel movement appear to be a significant problem in menopausal and geriatric patient population. High soluble fiber diet is also recommended in lowering cholesterol and risks of heart disorders and colon cancer. A clear beverage with high levels of soluble fiber, vitamins and minerals would be a health drink of choice, if the product can mimic all the properties of a regular fruit or cola beverage. With this invention, it is possible to produce good tasting carbonated cola beverages with elemental calcium in the range of 100% of daily recommended dose along with substantial amount of soluble dietary fiber (up to 100% U.S. RDA) and other nutrients in a single can or a bottle. This invention can bridge the gap that exists today between different types of fiber products, beverages and mineral supplements.

Soluble organic mineral salts can be incorporated in a clear fiber beverage by dissolving the pre-made salts in the ingredients of the beverage or by making the salts in situ by the chemical reaction between the organic acids and inorganic mineral bases. An ion exchange reaction can also be employed to incorporate these salts. Multiple mineral organic salts of appropriate concentration can also be made by treating the organic acid with blends of inorganic mineral bases. Incorporation of organic mineral salts in such a manner in the beverages results in a substantial cost savings. A clear beverage containing partially hydrolyzed vegetable gum to supply the soluble fiber, along with large amount of organic mineral salts can be made by incorporating 0.1 to 25% of hydrolyzed vegetable gum, 0.01 to 10% of organic mineral salts, 5 to 50% of mono or disaccharide, 0.01 to 5% of synthetic or natural intense sweeteners, 0.01 to 20% of organic or inorganic pharmacologically acceptable acidulate, 0.001 to 5% of flavoring agents, and 0.01 to 25% of treating agent. Such beverage products can also be carbonated from 0.1 to 10 volumes of gas to every volume of the liquid beverage. The beverages containing metal salts of organic acids are further buffered with organic acids to keep them in solution and prevent their precipitation in neutral or mildly alkaline mediums. Prevention of the precipitation helps the metal salts to overcome the first hurdle in the absorption process.

THE INVENTION

During the last decade, dietary fiber and calcium both have been recognized as important parts of healthful diet especially for women. Calcium and dietary fiber have to be administered in large quantities to get health benefits. The natural source of calcium, calcium carbonate, is a good and concentrated source of calcium. Unfortunately, it is practically insoluble in water and in alkaline intestinal medium. It is soluble in acidic conditions with liberation of carbon dioxide. This poor solubility of calcium carbonate along with gas formation during dissolution in acidic medium, is not suitable for people suffering from gastrointestinal problems. Achlorhydria, a common disorder in geriatric population, is another condition which precludes the use of calcium carbonate as a dietary supplement. Such geriatric population also suffers from constipation and poor bowel movements. Administration of mineral and calcium supplements often worsens this problem. Other calcium salts like calcium phosphates and calcium citrates also suffer from poor water solubility as well as insignificant solubility in basic or neutral conditions. This precludes their use in clear beverages. Due to the wide spread use of $H_2$ receptor antagonists and proton pump inhibitors, the percentage of population with reduced gastric acid secretion is increasing. Such patient population will be deprived of calcium due to the poor solubility and hence poor bioavailability of calcium from the traditional calcium supplements. Due to these reasons, it is increasingly important to improve the solubility of calcium supplements given to the target population and also to keep the supplements in a soluble form to improve absorption. Calcium lactate is found to be the most soluble salt of calcium and has a good taste profile. Further, it can be buffered in a clear beverage with organic food acidulants in the pH range of 2.5–4.5 to maintain an acidic pH at the site of absorption and thus increase bioavailability by maintaining good water solubility.

The major fiber components found in food and pharmaceutical use are polysaccharides, hemicellulose, gums, pectin, cellulose, β-glucon and synthetic polymers based on acrylic acid. Digestion of carbohydrates is dependent upon the type of linkage between the monomers. In glucose polymers like digestible starch, the α-linkages are generally susceptible to digestion by α-amylase secreted in the small intestine. α-linkages found in non-digestible gums and celluloses are hydrolyzed by microbial enzymes in the large intestine. Such polysaccharides act as nutrients to colonic micro-organisms and promote their overgrowth and help in formation of enlarged stool mass. Water holding capacity (WHC) of fiber has an important relationship with several physiological effects of fibers. Fibers with high solubility and high water holding capacity facilitate degradation of polysaccharides by allowing greater penetration of microbial enzymes into the polysaccharide structure.

High insoluble fiber containing food products with phytates and oxalates tend to bind minerals and increase their fecal excretion. The mineral absorption is likely to be compromised in individuals whose mineral intake is low and fiber supplement consumption is high. For this reason, it is rational to combine mineral supplements with fiber products to formulate a complete product. Gel-forming soluble fibers also tend to cause intestinal obstructs in rare cases, when taken with lower amounts of fluids or taken improperly in unhydrated forms. Low viscosity soluble fibers are devoid of any such problems as these do not form strong gels in limited amounts of fluid.

Dietary fiber appears to be an important ingredient in nutritional supplement intended for geriatric population due to several benefits like regularity in bowel movement, reduction in cholesterol and reduced risk of colon cancer. Increased fiber intake has been suggested for constipation, diverticulosis and irritable bowel syndrome. The current fiber source derived from psyllium is not suitable for incorporation into a clear flavored drink due to several reasons. High viscosity and gritty nature of the fiber along with pigments make it impossible to utilize such fibers in formulation of a clear liquid beverage. The modified cellulose fibers also suffer from similar problems. It will be ideal if we could combine clear soluble salt of calcium along with clear water-soluble fiber with low viscosity in a clear water-like flavored sweetened drink (or a drink mix or a liquid concentrate to be reconstituted as a clear liquid beverage). This invention specifically addresses different combinations of liquid concentrate and powder mixes to be reconstituted into a liquid beverage of buffered calcium lactate and mineral salts along with food acidulants and soluble fiber combinations with formulation aids and their manufacturing methods. The liquid products can be manufactured by two different methods:

Method 1

Incorporation of the calcium lactate monohydrate, trihydrate or pentahydrate in water and other organic mineral salts followed by addition of organic food grade acidulants as acidic buffers and other excipients and active ingredients.

Method 2

In situ preparation of calcium lactate

Addition of a dispersion of low lead calcium carbonate and other mineral carbonates, bicarbonates, oxides and hydroxides to the food grade heat stable DL or natural L(+) lactic acid 88% in molar amounts with small amount of excess lactic acid to drive the reaction to completion followed by incorporation of organic food grade acidulants as acidic buffers and other excipients. Preparations made by utilizing this method will result in substantial cost savings compared to the method 1.

Soluble fiber can be incorporated at any stage of the manufacture. Incorporation of mono, di and tricarboxylic acids in the system do not create any precipitate in the formulation. As high as 10% citric acid can be incorporated in such systems without any fear of formation of insoluble tricalcium citrate. The soluble fiber is a non-gel forming, low viscosity contributing polymer, made by partial hydrolysis of large polysaccharides and polymers or by polymerization of monomers to a fiber product having a low viscosity in aqueous solutions while maintaining non-digestibility in the stomach, small and large intestines by human digestive enzymes but may be degraded by microbial enzyme systems. Soluble fiber could be derived from low molecular weight partially hydrolyzed guar gum, partially hydrolyzed locust bean gum, partially hydrolyzed fenugreek gum, low molecular weight algin, partially hydrolyzed carrageenan, modified psyllium, partially hydrolyzed okra gum, modified hydrolyzed starch and other suitable low viscosity edible gums. Partially hydrolyzed guar gum, modified fenugreek gum and modified hydrolyzed starch derivatives are commercially available from different manufacturers. A variety of hydrophobic and hydrophilic vitamin and nutraceuticals can be incorporated in this system. Hydrophobic vitamins and nutraceuticals were incorporated into the system by forming phospholipid liposomes with average particle size of less than 250nm to maintain translucent appearance. Vitamin E acetate was incorporated into the drink in the form of a preliposomal mix containing phosphatidyl choline, phosphatidyl ethanolamine, ethoxylated hydrogenated castor oil and a hydroalcoholic processing aid to get the desired particle size of about 200 nm. Incorporation of such liposomes results in translucent orange type drink.

A powder mix to be reconstituted as a clear/translucent low viscosity beverage can be made by spray drying the solution/dispersion of the calcium lactate, low viscosity soluble fiber (like hydrolyzed guar gum), other mineral lactates (like zinc, iron, magnesium, potassium), sucrose, vitamin preliposomal mix (hydrophobic/hydrophilic vitamin, phosphatidyl choline, phosphatidyl ethanolamine, phosphatidic acid, ethoxylated hydrogenated castor oil and organic solvent like alcohol and propylene glycol) and flavors. Spray drying of such dispersions result in free-flowing granular powder mixes with excellent flow properties and quick dissolving characteristics. These powders can be further mixed with granulated sugar of varying particle sizes to obtain free-flowing powder mixes of varying sweetness. Low calorie/reduced calorie sweetened beverage is obtained similarly by substituting sucrose or any natural sweetener with artificial sweeteners like aspartame, saccharin and its salts, acesulpham K and glycerrhizinic acid and salts, and their various combinations. The ready-to-drink beverage or its concentrate can thus be formulated as a product sweetened with regular carbohydrate sweeteners or artificial sweeteners.

DETAILED DESCRIPTION OF PREFERRED EMBODIMENTS

EXAMPLE 1

Clear beverage containing 400 mg of elemental calcium and 3.8 grams of soluble fiber for every 250 mL of liquid

| Composition: | |
|---|---:|
| Lactic acid 88% food grade | 400 gms |
| Low lead calcium carbonate-precipitated, USP | 100 gms |
| Citric acid | 60.0 gms |
| Sodium benzoate | 12.0 gms |
| Hydrolyzed Guar gum | 500 gms |
| Orange flavor | 10 gms |
| Sucrose | 3000 gms |
| D&C Red 40 | 40 mg |
| D&C Yellow 6 | 58 mg |
| Filtered water qs to | 25000 ml. |

Procedure

To 100 grams of calcium carbonate dispersed in 15000 ml of filtered water is added 400 grams of L-lactic acid with vigorous mixing to get a clear solution. To this clear solution, 60 grams of citric acid dissolved in 500 ml of water is added with vigorous mixing to get a clear solution. 500 grams of hydrolyzed guar gum (containing at least 380 grams of soluble fiber) is blended with 3000 grams of sucrose and slowly added to the clear calcium lactate solution with vigorous stirring, carefully avoiding any lump formation. 12 grams of sodium benzoate dissolved in 500 ml of water is added to the solution with vigorous mixing. A solution of red and yellow colors mixed in 200 grams of water is added to the batch and the volume of the batch is adjusted to 25 liters. Temperature of the liquid is then quickly raised to 75° to 80° C. and the orange flavor is quickly blended into the batch. The resulting liquid is filtered through a coarse filter and hot filled in 250 ml steamed bottles and capped to get shelf stable clear liquid beverage containing 400 mg of elemental calcium and 3.8 grams of clear soluble fiber. The product is found to be stable under elevated and low temperature storage conditions.

EXAMPLE 2

The liquid concentrate to be reconstituted before use

| Composition: | |
|---|---:|
| Each 90 mL (3 oz.) is to be diluted to 240–270 mL (8–9 oz.): | |
| Lactic acid 88%, Food grade | 40.0 gms |
| Calcium carbonate, USP, Precipitated | 10.0 gms |
| Hydrolyzed guar gum soluble fiber | 50.0 gms |
| Citric acid | 5.0 gms |
| Sucrose | 260.0 gms |
| Flavor | 1.0 gm |
| Sodium benzoate | 1.2 gms |
| Water | q.s. 900.0 mL |

Procedure

Calcium carbonate, 10 gms is added to lactic acid, 40 gms, with vigorous mixing followed by addition of 400 mL of water. To this clear solution, add citric acid till dissolved. Sucrose and hydrolyzed guar gum fibers are mixed in a blender to obtain a uniform powder mix. This mix is added to the calcium solution with vigorous mixing to get a lump-free clear syrupy solution. Sodium benzoate dissolved in small amount of water is added to the solution. Water is added to the solution to make up to 900 mL. The concentrate can be colored, if required, with approved food colors.

EXAMPLE 3
Preparation of powder mix for reconstitution

| Composition: | |
|---|---|
| Calcium lactate pentahydrate | 28.0 gms |
| Hydrolyzed guar gum | 50.0 gms |
| Powdered citric acid | 5.0 gms |
| Granulated sugar | 265.0 gms |
| Flavor, spray dried | 2.0 gms |

Procedure

Calcium lactate pentahydrate is milled to obtain a particle size of 50–150 microns. This is further blended with granulated sugar, powdered citric acid, guar gum and flavor to get a free-flowing powder formulation which contains 400 mg of elemental calcium and 3.8 gms of dietary soluble fiber for every 35 gms of powder mix. This powder mix when diluted with 8 ounces of water gives a clear drink with taste profile similar to marketed fruit beverages.

EXAMPLE 4
Clear natural fruit juice drinks with soluble calcium. zinc and soluble fiber

| Composition: | |
|---|---|
| L(+) Lactic acid 88%, food grade | 40.0 gms |
| Calcium carbonate USP | 10.0 gms |
| Zinc carbonate USP | 0.15 g |
| Soluble fiber from hydrolyzed guar gum | 50.0 gms |
| Apple juice concentrate | 600.0 mL |
| Water filtered | qs to 2400.0 mL |

Procedure

Calcium carbonate and zinc carbonate is added to the lactic acid solution with vigorous mixing. To this dispersion, 1000 ml of filtered water is added with vigorous mixing to get a clear solution. Into this clear solution, soluble fiber is dispersed with high speed mixing to get a lump-free clear solution. This solution is filtered through a filter cartridge and the apple juice concentrate is added to the solution with mixing. The resulting solution is diluted to the final volume and sterilized at 85° C. and filled in pre-sterilized bottles to get all natural preservative free beverage.

EXAMPLE 5
Fluid bed agglomerated granules for reconstitution

| Composition: | |
|---|---|
| Approximately 35–38 g of the agglomerate contains 3.8 g of soluble fiber, 400 mg of elemental calcium, and zinc. | |
| Hydrolyzed guar gum powder, 80 mesh | 50.0 gms |
| Powdered sugar | 280.0 gms |
| Powdered citric acid | 5.0 gms |
| Granulating fluid | |
| Calcium carbonate | 10.0 gms |
| Zinc carbonate | 0.15 g |
| Lactic acid 88% | 40.0 gms |
| Water | 100.0 mL |

Procedure

The spray agglomeration fluid is prepared by adding zinc and calcium carbonate to a solution of lactic acid and heating to around 70°–80° C. to keep it in solution. This solution is sprayed onto a fluidized bed of guar gum and powdered sugar and other formulation aids at around 60° C. to get a granular agglomerate of powdered sugar, fiber and mineral supplements.

EXAMPLE 6
Preservative-free carbonated cola beverage composition with calcium and soluble fibers

| Composition | |
|---|---|
| Lactic Acid 88% | 40.0 gms |
| Calcium Carbonate | 10.0 gms |
| Soluble Fiber | 50.0 gms |
| High Fructose Corn Syrup | 330.0 gms |
| Citric Acid* | 6.0 gms |
| Flavor | 1.0 gms |
| Caffiene | 300.0 mg |
| Filtered Water | q.s. to 2400 mL |
| Carbon dioxide gas | 8000 mL |

*Part of citric acid can be replaced by phosphoric acid.

Procedure

Calcium carbonate is added to a solution of lactic acid with vigorous mixing to get a clear solution. Soluble fiber is added with high speed mixing to get a lump-free solution. To this clear solution, caffiene and citric acid dissolved in small amount of water is added with mixing. Sugar syrup along with flavor is added to the fiber solution and the volume is made up to 2400 mL. This solution is quickly heated to 80° C. for few minutes and cooled to 15° to 20° C. This cooled solution is filtered and carbonated with approximately 8000 ml of carbon dioxide gas.

EXAMPLE 7
Low Calorie Flavored Beverage With Calcium And Soluble Fiber

| Composition: | |
|---|---|
| Lactic acid 88% | 40.0 g |
| Calcium carbonate | 10.0 g |
| Soluble fiber | 50.0 g |
| Citric acid | 5.0 g |
| Aspartame | 25.0 mg |
| Acesulpham K | 25.0 mg |
| Flavor | 1.0 g |
| Water filtered | qs to 2400 ml |
| Carbon dioxide gas | 5000 ml |

Procedure

Calcium carbonate is added to a solution of lactic acid with vigorous mixing to get a clear solution. Hydrolyzed guar gum soluble fiber is added with high speed mixing to get a lump-free solution. Citric acid dissolved in small amount of water is added to this solution followed by addition of flavor, aspartame and acesulpham K. This solution is made to 2400 ml with water and filtered to get a clear solution. This is then carbonated with 5000 ml of carbon dioxide gas and bottled in 8 oz. bottles.

EXAMPLE 8
Translucent bottled beverage with calcium soluble fiber and liposomal vitamin E A. Composition of formulation

| | |
|---|---|
| Lactic acid, food grade 88% | 40.0 gms |
| Calcium carbonate | 10.0 gms |
| Potassium carbonate | 1.0 g |
| Citric Acid | 5.0 gms |
| Vitamin C | 0.6 g |
| Soluble fiber | 50.0 gms |
| Sucrose, beverage grade | 300.0 gms |

-continued

| | |
|---|---|
| Sodium benzoate | 1.2 gms |
| Liposomal premix of Vit. E | 3.0 mL |
| Flavor | 1.0 mL |
| Color blend | |
| Water, filtered | q.s. to 2400 mL |
| B. Composition of Liposomal Premix | |
| Lecithin, purified | 20.0 gms |
| Hydrogenate castor oil, ethoxylated, 40 moles | 6.0 gms |
| Vit. E acetate | 10.0 gms |
| Grain alcohol, USP | 40.0 mL |
| Water purified | q.s. to 100.0 mL |

Procedure: Liposomal Premix

Highly purified soya lecithin is dissolved in grain alcohol along with ethoxylated castor oil and Vitamin E to get a clear solution. To this solution, water is added with vigorous stirring under homogenizing conditions to get a translucent to clear product.

Formulation

Dissolve calcium carbonate and potassium carbonate in lactic acid containing 1500 mL of water with vigorous mixing. Vitamin C and citric acid are added to this solution with mixing. Next, add the blend of fiber and sugar with vigorous mixing to get a clear solution. Sodium benzoate, dissolved in small amount of water is added to the solution followed by colors and flavors. Add 3 mL of liposomal Vit. E premix with vigorous mixing to get a translucent product which is then made up to volume with filtered water.

EXAMPLE 9

Bottled beverage with soluble fiber, soluble mineral salts and B-complex vitamins

| Composition: | |
|---|---|
| Lactic acid, 88% | 40.0 gms |
| Calcium carbonate | 10.0 gms |
| Potassium carbonate | 1.0 gms |
| Citric acid | 5.0 gms |
| Soluble fiber | 50.0 gms |
| Sodium benzoate | 1.2 gms |
| Sucrose | 300.0 gms |
| Vit. $B_1$ | 15 mg |
| Niacinamide | 200 mg |
| Vit. $B_{12}$ | 60 mcg |
| Vit. $B_6$ | 20 mg |
| Vit. C | 600 mg |
| Vit. E. Liposomal premix | 3.0 mL |
| Orange flavor | 1.0 mL |
| Water | q.s to 2,400 mL |

Procedure

Same as procedure 8, except that addition of Vitamins of the B group is done at the end of the process and the ingredients are mixed well to get a translucent drink solution.

CONSUMER ACCEPTANCE TESTS

Method

Consumer population, 10 people, in the age group of 25–65 were asked to rate the taste, smell and appearance of the following three beverages in a blinded and an open study.

1. An 8 oz. of clear beverage made by incorporating the current invention,
2. Freshly prepared Metamucil, orange flavored, prepared as per the directions on the label,
3. A popular, nationally advertised clear citrus beverage (Gatorade).

For the blind study, the three drinks were labeled as drink#1, drink#2 and drink#3, in the above order. The consumers were asked to evaluate the product on a 1 to 10 scale based on its appearance, taste, smell and their likelihood of buying the drink. For the open study, these beverages were correctly labeled with their trade names and the advantages and disadvantages of each, along with any claims that can be made, were disclosed to the sumers who had tasted the products in the blind test. They were then asked to re-evaluate the drinks.

The results are tabulated as below:

| | Drink#1 | | Drink#2 | | Drink#3 | |
|---|---|---|---|---|---|---|
| Subject# | B | O | B | O | B | O |
| 1 | 8 | 9 | 3 | 5 | 8 | 7 |
| 2 | 7 | 7 | 4 | 4 | 7 | 5 |
| 3 | 6 | 9 | 5 | 7 | 6 | 6 |
| 4 | 8 | 8 | 4 | 6 | 8 | 4 |
| 5 | 9 | 10 | 5 | 6 | 9 | 6 |
| 6 | 7 | 7 | 2 | 4 | 8 | 6 |
| 7 | 9 | 8 | 4 | 4 | 9 | 8 |
| 8 | 6 | 8 | 3 | 5 | 6 | 3 |
| 9 | 8 | 10 | 2 | 4 | 8 | 2 |
| 10 | 7 | 9 | 4 | 5 | 7 | 5 |
| Average | 7.5 | 8.5 | 3.6 | 5.0 | 7.6 | 5.2 |

Based on the above consumer study, it is clear that the clear fiber beverage made according to the current invention is highly preferred compared to the marketed product Metamucil in blind as well as in the open study. The product made with the current invention performed almost as good as a marketed non-carbonated beverage in the blind study, but did very well in the open study, which highlighted the contents and possible claims and benefits of the beverages.

It is understood that the invention is not to be limited to the exact compositions, methods of preparation and embodiments shown and any obvious modifications will be apparent to one skilled in the art.

I claim:

1. A clear, low viscosity, water-like, stable, ready-to-use, bottled, carbonated or non-carbonated drink or a concentrated clear liquid for reconstitution or a powder/granular mix to be reconstituted with water or any other orally ingestible liquid as a drinkable liquid, containing a non-gelling partially hydrolyzed soluble dietary fiber, water soluble salts of calcium, with or without water soluble vitamins, with or without additional mineral supplements from the group consisting of salts of K, Zn, Fe, Mg or mixtures thereof and buffered with food acids.

2. The beverage of claim 1, where soluble fiber is a low viscosity contributing polymer, made by partial hydrolysis of large polysaccharides and polymers or by polymerization of monomers to a fiber product which is capable of forming clear non-viscous solutions while retaining non-digestibility in stomach, small and large intestines by human digestive enzymes but may be degraded by microbial enzyme system.

3. The beverage of claim 2, where the low-viscosity-contributing soluble fiber is any one of the partially hydrolyzed guar gum, beta-linked polyglucose polymers, semi-synthetic hydrolyzed cellulose gums, modified hydrolyzed starch, partially hydrolyzed alginates and carageenans and hydrolyzed vegetable gums from the group consisting of psyllium, locust bean, fenugreek and okra vegetable gums and combinations thereof.

4. Beverage of claim 1, which is made either by using preformed water soluble lactate, gluconate or other organic acid salts of minerals in combination with excess organic or inorganic acids or by preparing the mineral complexes in situ at the time of manufacture by reacting excess amount of appropriate food acids with inorganic carbonates, bicarbonates, hydroxides or oxides of the appropriate mineral.

5. Beverage of claim 1, where nutrients and vitamins are incorporated in the form of liposomes, with an average particle size of less than 250 nm.

6. The beverage of claim 5, where the liposomes, made of any one of hydrophobic vitamins or combinations thereof, are in 0.001 to 10% concentration at the time of human intake.

7. Beverage of claim 3, where the liposomes incorporated are partially stabilized by the soluble fiber in the beverage.

8. The beverage of claim 1, where the food acid is any one of citric, lactic, maleic, adipic, succinic, acetic gluconic, lactobionic, ascorbic, pyruvic, phosphoric acid and combinations thereof.

9. The beverage of claim 8, where the food acid is between 0.01–20% by weight of the pharmacologically acceptable edible acid at the time of consumer intake.

10. Beverage of claim 9, where said food acid is partially neutralized by a food grade organic base comprising choline, which results in improvement of flavor and reduction in the amine odor.

11. The beverage of claim 1, where the mineral supplement is any one of calcium, magnesium, potassium, zinc, sodium, iron, and their various combinations.

12. The beverage of claim 1, wherein the mineral composition is 0.01–10% by weight at the time of consumer intake.

13. The beverage of claim 1, where the dietary fiber, which contributes a low-amount of viscosity to the drink, comprises between 0.1–25% by weight at the time of consumer intake.

14. Beverage of claim 1, which is buffered with food acids and their mineral salts to an acidic pH in the range of 2.5 to 4.5 in order to maintain the solubility and clarity of the mineral compositions.

15. Beverage of claim 1, which is carbonated with carbon dioxide in order to improve the taste and appearance of the beverage.

16. Beverage of claim 15, wherein the volume of gas to liquid is in the range of 0.1 to 10 volumes of gas to 1 volume of liquid.

17. Beverage of claim 1, where the said orally ingestible liquid is a malted and/or fermented beverage with or without alcohol.

18. Beverage of claim 17, where the malted beverage is treated with hops.

* * * * *